(12) United States Patent
    Kawai

(10) Patent No.:     US 12,665,377 B2
(45) Date of Patent:        Jun. 23, 2026

(54) LIGHT SUPPLY APPARATUS

(71) Applicant: NEC Corporation, Tokyo (JP)

(72) Inventor: Motoyoshi Kawai, Tokyo (JP)

(73) Assignee: NEC CORPORATION, Tokyo (JP)

( * ) Notice:    Subject to any disclaimer, the term of this patent is extended or adjusted under 35 U.S.C. 154(b) by 516 days.

(21) Appl. No.: 18/229,938

(22) Filed: Aug. 3, 2023

(65)                Prior Publication Data

US 2024/0055823 A1       Feb. 15, 2024

(30)          Foreign Application Priority Data

Aug. 15, 2022    (JP) ................................. 2022-129222

(51) Int. Cl.
     *H01S 3/0941*            (2006.01)
(52) U.S. Cl.
     CPC .................................. *H01S 3/0941* (2013.01)
(58) Field of Classification Search
     CPC ..................................................... H01S 3/0941
     USPC .......................................................... 359/345
     See application file for complete search history.

(56)                  References Cited

U.S. PATENT DOCUMENTS

| | | | | |
|---|---|---|---|---|
| 6,008,934 A * | 12/1999 | Fatehi | ................. | H01S 3/06754 |
| | | | | 398/175 |
| 6,031,646 A * | 2/2000 | Sniadower | ......... | H04B 10/2912 |
| | | | | 398/1 |
| 6,747,788 B2 * | 6/2004 | Kinoshita | .......... | H04B 10/2916 |
| | | | | 359/334 |

| | | | | |
|---|---|---|---|---|
| 7,391,562 B2 * | 6/2008 | Kinoshita | ............ | H04B 10/294 |
| | | | | 359/341.32 |
| 9,899,792 B1 * | 2/2018 | Winzer | ............... | H01S 3/06754 |
| 2002/0008901 A1 * | 1/2002 | Kinoshita | ............... | H01S 3/302 |
| | | | | 359/341.1 |
| 2021/0044075 A1 | 2/2021 | Mikami et al. | | |
| 2022/0095435 A1 | 3/2022 | Xu et al. | | |
| 2022/0102932 A1 | 3/2022 | Mikami | | |
| 2023/0239982 A1 | 7/2023 | Xu et al. | | |
| 2024/0120703 A1 * | 4/2024 | Takeshita | .......... | H01S 3/094061 |

FOREIGN PATENT DOCUMENTS

| | | |
|---|---|---|
| CN | 112034564 A | 12/2020 |
| JP | H11-072622 A | 3/1999 |
| WO | 2019/176205 A1 | 9/2019 |
| WO | 2020/158532 A1 | 8/2020 |

OTHER PUBLICATIONS

J. Chesnoy et al., "Undersea Fiber Communication Systems (2nd Edition)", Academic Press, 2016, pp. 422-427.
Japanese Office Action for JP Application No. 2022-129222, mailed on May 12, 2026 with English Translation.

* cited by examiner

*Primary Examiner* — Daniel A Hess
(74) *Attorney, Agent, or Firm* — Sughrue Mion, PLLC

(57)                  ABSTRACT

A light supply apparatus includes a second optical coupler, two first optical couplers, and excitation laser modules (light output units). Each of the first optical couplers is configured to have four input ports and four output ports. The second optical coupler is configured to have two input ports and two output ports. One of the input ports of the one first optical coupler is connected to one of the output ports of the second optical coupler. One of the input ports of the other first optical coupler is connected to another one of the output ports of the second optical coupler.

8 Claims, 4 Drawing Sheets

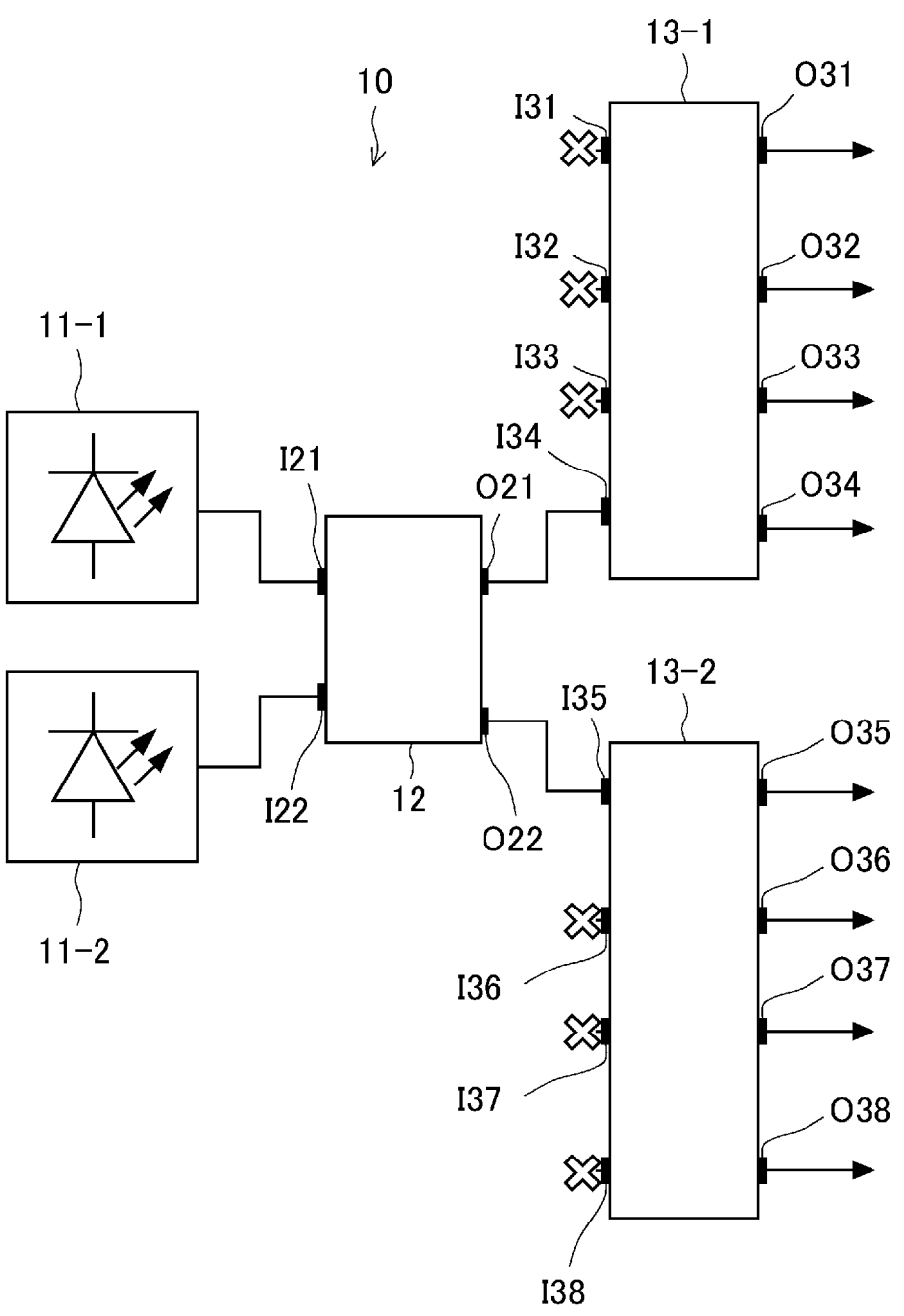
F i g. 1

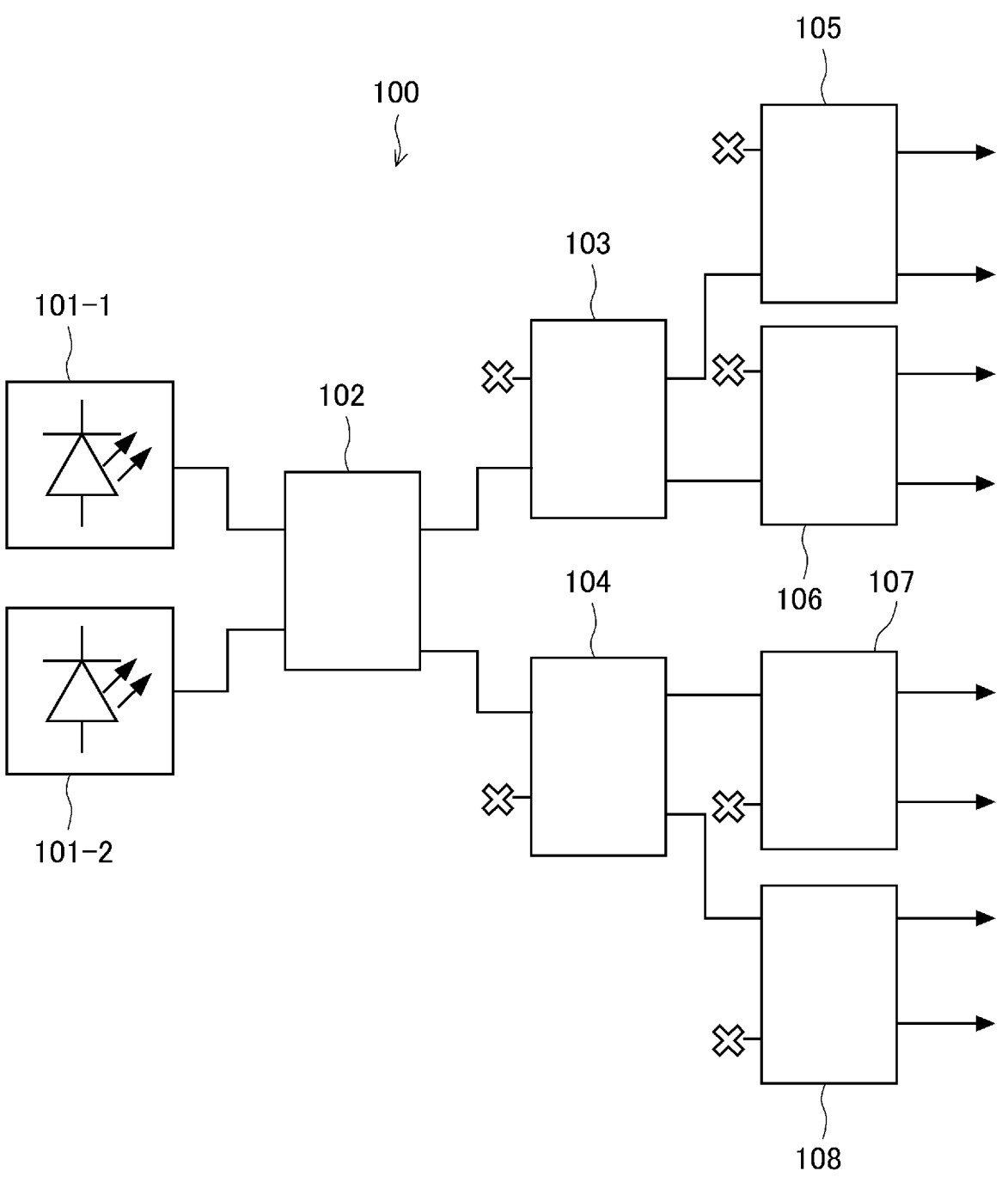
F i g. 2

LIGHT SUPPLY APPARATUS

INCORPORATION BY REFERENCE

This application is based upon and claims the benefit of priority from Japanese patent application No. 2022-129222, filed on Aug. 15, 2022, the disclosure of which is incorporated herein in its entirety by reference.

TECHNICAL FIELD

The present disclosure relates to a light supply apparatus.

BACKGROUND ART

In a communication network laid on the seabed, dense wavelength division multiplexing (DWDM) system is being used, for example. In a repeater being used in a WDM system, an optical amplification medium (hereinafter, sometimes referred to as an "optical fiber amplifier") to which a rare earth element such as erbium is doped is generally used. Such an optical fiber amplifier amplifies an attenuated optical signal to an appropriate level by the rare earth element being excited with excitation light.

A light supply apparatus that supplies laser light to an optical fiber amplifier is disclosed in Non Patent Literature 1 (J. Chesnoy, et al., 'Undersea Fiber Communication Systems (2$^{nd}$ EDITION)', Academic Press, 2016, page 425, FIG. 12.2). Such a light supply apparatus includes two excitation laser modules (light output units) and a 2×2 optical coupler. The 2×2 optical coupler divides (demultiplexer) light being acquired by combining (multiplexing) light being output from the two excitation laser modules, into two beams of light. The two demultiplexed light beams are supplied to two optical fiber amplifiers each provided in a first fiber and a second fiber being included in a fiber pair of a repeater. One of the first fiber and the second fiber being included in the fiber pair is directed in an up direction and another is directed in a down direction. Herein, the light supply apparatus includes two excitation laser modules and has a redundant configuration. Thus, even when one of the excitation laser modules (light output units) fails, light being supplied to the optical fiber amplifier is not interrupted, and thereby reliability of the repeater may be improved.

Recently, in order to supply excitation light to each of further more optical fiber pairs, use of further more excitation laser modules (light output units) are being considered. As a result, by increasing the number of excitation laser modules (light output units) being used for supplying excitation light to each fiber pair and thereby increasing redundancy of the light supply apparatus, it is possible to improve reliability of a repeater.

However, in a case of achieving a light supply apparatus having high redundancy concerning an excitation laser module (light output unit) by using the technique disclosed in Non Patent Literature 1, the number of optical couplers being used increases as redundancy increases, and the structure becomes complicated. In addition, since the number of splice portions increases, the number of man-hours for manufacturing the light supply apparatus increases, and work for manufacturing also becomes complicated.

SUMMARY

An example object of the present disclosure is to provide a light supply apparatus that is able to achieve redundancy of an excitation laser module (light output unit) with a simpler configuration.

In one example aspect, a light supply apparatus according to the present disclosure is a light supply apparatus that outputs excitation light for exciting an amplification medium of an optical amplification apparatus, and includes:

two first optical couplers each configured to have M (M is an integer of 3 or more) input ports and M output ports;

a second optical coupler configured to have N (N is an even number of 2 or more and M or less) input ports and N output ports; and N light output units each configured to be connected to the N input ports; wherein N/2 input ports of each of the first optical couplers are connected to N/2 output ports of the second optical coupler, and N/2 output ports of the second optical coupler to which one of the two first optical couplers is being connected are different from N/2 output ports of the second optical coupler to which another of the two first optical couplers is being connected.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 1 is a block diagram illustrating one example of a light supply apparatus according to a first example embodiment;

FIG. 2 is a block diagram illustrating one example of a light supply apparatus according to a comparative example;

EXAMPLE EMBODIMENT

Figure 3:
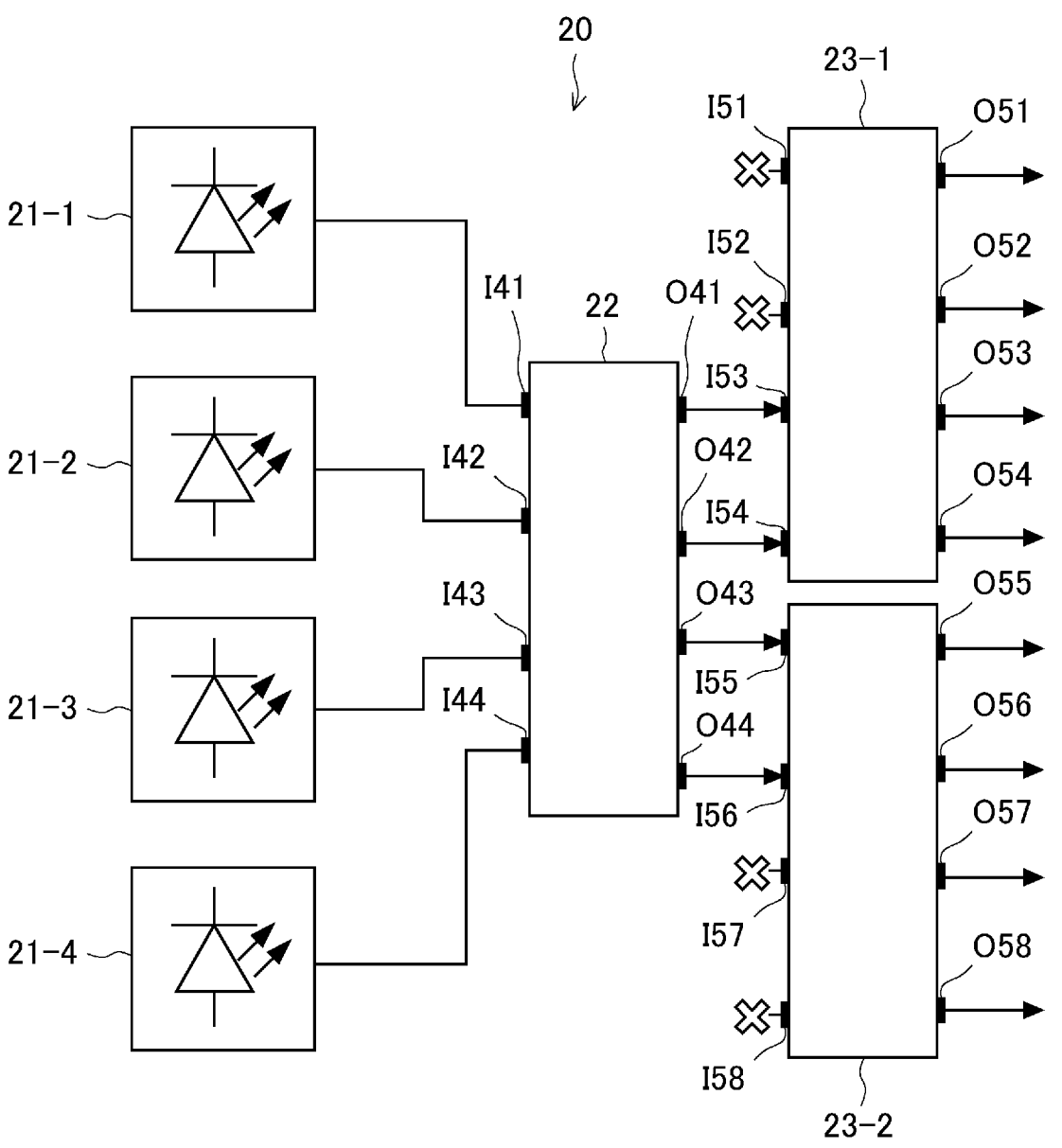
FIG. 3 is a block diagram illustrating one example of a light supply apparatus according to a second example embodiment.

Hereinafter, example embodiments will be described with reference to the drawings. Note that, in the example embodiments, the same or equivalent elements are denoted by the same reference numbers, and redundant description thereof will be omitted.

First Example Embodiment

FIG. 1 is a block diagram illustrating one example of a light supply apparatus according to a first example embodiment. In FIG. 1, a light supply apparatus 10 includes excitation laser modules (light output units) 11-1 and 11-2, an optical coupler (second optical coupler) 12, and optical couplers (first optical couplers) 13-1 and 13-2. Note that, in the following description, when the excitation laser modules (light output units) 11-1 and 11-2 are not distinguished from each other, such modules may be simply referred to as an excitation laser module (light output unit) 11, and when the optical couplers (first optical couplers) 13-1 and 13-2 are not distinguished from each other, such couplers may be simply referred to as an optical coupler (first optical coupler) 13.

The excitation laser module 11 is, for example, a laser diode. The excitation laser module 11 outputs laser light to the optical coupler 12. Specifically, the excitation laser module 11-1 is connected to an input port I21 of the optical coupler 12. The laser light output from the excitation laser module 11-1 is input to an input port I21 of the optical coupler 12. The laser light output from the excitation laser module 11-2 is input to an input port I22 of the optical coupler 12.

The optical coupler 12 includes the input ports I21 and I22 and output ports O21 and O22. That is, the optical coupler 12 is a 2×2 optical coupler. The optical coupler 12 divides combined light being acquired by combining (multiplexing) the laser light input from the input port I21 and the laser light input from the input port I22 into two beams of light, and outputs the two beams of light from the output ports O21 and O22, respectively. That is, the optical coupler 12 distributes the combined light of the laser light input from the input port I21 and the laser light input from the input port I22 to the output ports O21, O22. Therefore, each beam of the light being output from the output port O21 and the light being output from the output port O22 includes both the laser light input from the input port I21 and the laser light input from the input port I22.

The output port O21 of the optical coupler 12 is connected to an input port I34 of the optical coupler 13-1, and the output port O22 is connected to an input port I35 of the optical coupler 13-2.

The optical coupler 13-1 includes input ports I31 to I34 and output ports O31 to O34. That is, the optical coupler 13-1 is a 4×4 optical coupler. As described above, the input port I34 is connected to the output port O21 of the optical coupler 12. Meanwhile, the input ports I31 to 133 are terminated by non-reflective terminators (not illustrated). As a result, it is possible to prevent deterioration of light (excitation light) caused by interference or the like.

The optical coupler 13-1 divides laser light input from the input port I34 into four beams of light, and outputs the four beams of light from the output ports O31 to O34, respectively. That is, the optical coupler 13-1 distributes the laser light input from the input port I34 to the output ports O31 to O34. Therefore, each beam of the light output from the output ports O31 to O34 includes both of the laser light output from the excitation laser modules 11-1 and 11-2. Thus, even when one of the excitation laser modules 11 fails, the light being supplied to the optical fiber amplifier is not interrupted, and thereby the reliability of a repeater (not illustrated) may be improved.

Excitation light output from the output port O31 is supplied to a first optical amplification medium (optical fiber amplifier) provided in a first optical fiber via a first WDM coupler in an optical amplification apparatus of the repeater (not illustrated). Similarly, excitation light output from the output port O32 is supplied to a second optical amplification medium provided in a second optical fiber via a second WDM coupler in the optical amplification apparatus of the repeater (not illustrated). Excitation light output from the output port O33 is supplied to a third optical amplification medium provided in a third optical fiber via a third WDM coupler in the optical amplification apparatus of the repeater (not illustrated). Excitation light output from the output port O34 is supplied to a fourth optical amplification medium provided in a fourth optical fiber via a fourth WDM coupler in the optical amplification apparatus of the repeater (not illustrated). For example, the first optical fiber and the second optical fiber may constitute a first fiber pair, and the third optical fiber and the fourth optical fiber may constitute a second fiber pair.

The optical coupler 13-2 includes input ports I35 to I38 and output ports O35 to O38. That is, the optical coupler 13-2 is a 4×4 optical coupler. As described above, the input port I35 is connected to the output port O22 of the optical coupler 12. Meanwhile, the input ports I36 to I38 are terminated by non-reflective terminators (not illustrated). As a result, it is possible to prevent deterioration of light (excitation light) caused by interference or the like.

The optical coupler 13-2 divides laser light input from the input port I35 into four beams of light, and outputs the four beams of light from the output ports O35 to O38, respectively. That is, the optical coupler 13-2 distributes the laser light input from the input port I35 to the output ports O35 to O38. Therefore, each beam of the light output from the output ports O35 to O38 includes both of the laser light output from the excitation laser modules 11-1, 11-2.

Excitation light output from the output port O35 is supplied to a fifth optical amplification medium (optical fiber amplifier) provided in a fifth optical fiber via a fifth WDM coupler in the optical amplification apparatus of the repeater (not illustrated). Similarly, excitation light output from the output port O36 is supplied to a sixth optical amplification medium provided in a sixth optical fiber via a sixth WDM coupler in the optical amplification apparatus of the repeater (not illustrated). Excitation light output from the output port O37 is supplied to a seventh optical amplification medium provided in a seventh optical fiber via a seventh WDM coupler in the optical amplification apparatus of the repeater (not illustrated). Excitation light output from the output port O38 is supplied to an eighth optical amplification medium provided in an eighth optical fiber via an eighth WDM coupler in the optical amplification apparatus of the repeater (not illustrated). For example, the fifth optical fiber and the sixth optical fiber may constitute a third fiber pair, and the seventh optical fiber and the eighth optical fiber may constitute a fourth fiber pair.

As described above, according to the first example embodiment, the light supply apparatus 10 includes the optical coupler 12, the optical couplers 13-1 and 13-2, and the excitation laser modules (light output units) 11-1 and 11-2. The optical couplers 13-1 and 13-2 each includes four input ports and four output ports. The optical coupler 12 includes two input ports and two output ports. One of the input ports of the optical coupler 13-1 is connected to one of the output ports of the optical coupler 12. One of the input ports of the optical coupler 13-2 is connected to the other one of the output ports of the optical coupler 12.

According to the configuration of the light supply apparatus 10, laser light output from the excitation laser modules 11-1 and 11-2 may be supplied to eight optical amplification media (optical fiber amplifiers) by using three couplers (optical couplers 12, 13-1, and 13-2).

Comparative Example

FIG. 2 is a block diagram illustrating one example of a light supply apparatus according to a comparative example. A light supply apparatus 100 illustrated in FIG. 2 utilizes the technology disclosed in Non Patent Literature 1. The light supply apparatus 100 includes two excitation laser modules 101-1, 101-2 and optical couplers 102 to 108. Each of the optical couplers 102 to 108 is a 2×2 optical coupler.

As described above, the light supply apparatus 100 of the comparative example requires seven optical couplers, while the light supply apparatus 10 may be achieved by three couplers (optical couplers 12, 13-1, and 13-2). Further, in the light supply apparatus 100 of the comparative example, the number of splice points is eight, while in the light supply apparatus 10, the number of splice points is four. That is, the light supply apparatus 10 is able to achieve redundancy of the excitation laser module (light output unit) with a simpler configuration.

Note that, in the above description, description is made on the assumption that the second optical coupler is a 2×2 optical coupler and the first optical coupler is a 4×4 optical coupler, but the present disclosure is not limited thereto. The light supply apparatus of the present disclosure may be generalized as follows.

That is, the light supply apparatus of the present disclosure is a light supply apparatus that outputs excitation light for exciting an amplification medium of an optical amplification apparatus and includes: two first optical couplers each configured to have M (M is an integer of 3 or more) input ports and M output ports; a second optical coupler configured to have N (N is an even number of 2 or more and M or less) input ports and N output ports; wherein N/2 input ports of each of the first optical couplers are connected to N/2 output ports of the second optical coupler, and N/2 output ports of the second optical coupler to which one of the two first optical couplers are being connected are different from N/2 output ports of the second optical coupler to which the other of the two first optical couplers are being connected.

A variation of the configuration of the light supply apparatus of the present disclosure will be described in a second example embodiment and a third example embodiment.

Second Example Embodiment

The second example embodiment relates to a variation of the configuration of the light supply apparatus.

FIG. 3 is a block diagram illustrating one example of a light supply apparatus according to the second example embodiment. In FIG. 3, a light supply apparatus 20 includes excitation laser modules (light output units) 21-1, 21-2, 21-3, and 21-4, an optical coupler (second optical coupler) 22, and optical couplers (first optical couplers) 23-1 and 23-2. Note that, in the following description, when the excitation laser modules (light output units) 21-1, 21-2, 21-3, and 21-4 are not distinguished from one another, such modules are simply referred to as an excitation laser module (light output unit) 21, and when the optical couplers (first optical couplers) 23-1 and 23-2 are not distinguished from each other, such couplers may be simply referred to as an optical coupler (first optical coupler) 23.

The excitation laser module 21 is, for example, a laser diode. The excitation laser module 21 outputs laser light to the optical coupler 22. Specifically, the excitation laser module 21-1 is connected to an input port I41 of the optical coupler 22. The laser light output from the excitation laser module 21-1 is input to the input port I41 of the optical coupler 22. The laser light output from the excitation laser module 21-2 is input to an input port I42 of the optical coupler 22. The laser light output from the excitation laser module 21-3 is input to an input port I43 of the optical coupler 22. The laser light output from the excitation laser module 21-4 is input to an input port I44 of the optical coupler 22.

The optical coupler 22 includes the input ports I41, I42, I43, and I44 and output ports O41, O42, O43, and O44. That is, the optical coupler 22 is a 484 optical coupler. The optical coupler 22 divides combined light being acquired by combining (multiplexing) the laser light input from the input ports I41, I42, I43, and I44 into four beams of light, and outputs the four beams of light from the output ports O41, O42, O43, and O44, respectively. That is, the optical coupler 22 distributes the combined light of the laser light input from the input ports I41, I42, I43, and I44 to the output ports O41, O42, O43, and O44. Therefore, each beam of the light being output from each of the output ports O41, O42, O43, and O44 includes all of the laser light input from the input ports I41, I42, I43, and I44.

The output ports O41 and O42 of the optical coupler 22 are connected to input ports I53 and I54 of the optical coupler 23-1, respectively, and the output ports O43 and O44 are connected to input ports I55 and I56 of the optical coupler 23-2, respectively.

The optical coupler 23-1 includes input ports I51 to I54 and output ports O51 to O54. That is, the optical coupler 23-1 is a 484 optical coupler. As described above, the input ports I53 and I54 are connected to the output ports O41 and O42 of the optical coupler 22, respectively. Meanwhile, the input ports I51 and 152 are terminated by non-reflective terminators (not illustrated). As a result, it is possible to prevent deterioration of light (excitation light) caused by interference or the like.

The optical coupler 23-1 divides combined light acquired by combining (multiplexing) the light input from the input ports I53 and I54 into four beams of light, and outputs the four beams of light from the output ports O51 to O54, respectively. That is, the optical coupler 23-1 distributes the combined light of the laser light input from the input ports I53 and I54 to the output ports O51 to O54. Therefore, each beam of the light being output from the output ports O51 to O54 includes all of the laser light output from the excitation laser modules 21-1, 21-2, 21-3, and 21-4. Thus, even when any of the excitation laser modules 21 fails, the light being supplied to the optical fiber amplifier is not interrupted, and thereby the reliability of a repeater (not illustrated) may be improved.

Excitation light output from the output port O51 is supplied to a first optical amplification medium (optical fiber amplifier) provided in a first optical fiber via a first WDM coupler in an optical amplification apparatus of the repeater (not illustrated). Similarly, excitation light output from the output port O52 is supplied to a second optical amplification medium provided in a second optical fiber via a second WDM coupler in the optical amplification apparatus of the repeater (not illustrated). Excitation light output from the output port O53 is supplied to a third optical amplification medium provided in a third optical fiber via a third WDM coupler in the optical amplification apparatus of the repeater (not illustrated). Excitation light output from the output port O54 is supplied to a fourth optical amplification medium provided in a fourth optical fiber via a fourth WDM coupler in the optical amplification apparatus of the repeater (not illustrated). For example, the first optical fiber and the second optical fiber may constitute a first fiber pair, and the third optical fiber and the fourth optical fiber may constitute a second fiber pair.

The optical coupler 23-2 includes input ports I55 to I58 and output ports O55 to O58. That is, the optical coupler 23-2 is a 4×4 optical coupler. As described above, the input ports I55 and I56 are connected to the output ports O43 and O44 of the optical coupler 22, respectively. Meanwhile, the input ports I57 and I58 are terminated by non-reflective terminators (not illustrated). As a result, it is possible to prevent deterioration of light (excitation light) caused by interference or the like.

The optical coupler 23-2 divides combined light being acquired by combining (multiplexing) the light input from the input ports I55 and I56 into four beams of light, and outputs the four beams of light from the output ports O55 to O58, respectively. That is, the optical coupler 23-2 distributes the combined light of the laser light input from the input ports I55 and I56 to the output ports O55 to O58. Therefore, each beam of the light being output from the output ports O55 to O58 includes all the laser light output from the excitation laser modules 21-1, 21-2, 21-3, and 21-4.

Excitation light output from the output port O55 is supplied to a fifth optical amplification medium (optical fiber amplifier) provided in a fifth optical fiber via a fifth WDM coupler in the optical amplification apparatus of the repeater (not illustrated). Similarly, excitation light output from the output port O56 is supplied to a sixth optical amplification medium provided in a sixth optical fiber via a sixth WDM coupler in the optical amplification apparatus of the repeater (not illustrated). Excitation light output from the output port O57 is supplied to a seventh optical amplification medium provided in a seventh optical fiber via a seventh WDM coupler in the optical amplification apparatus of the repeater (not illustrated). Excitation light output from the output port O58 is supplied to an eighth optical amplification medium provided in an eighth optical fiber via an eighth WDM coupler in the optical amplification apparatus of the repeater (not illustrated). For example, the fifth optical fiber and the sixth optical fiber may constitute a third fiber pair, and the seventh optical fiber and the eighth optical fiber may constitute a fourth fiber pair.

As described above, according to the first example embodiment, the light supply apparatus 20 includes the optical coupler 22, the optical couplers 23-1 and 23-2, and the excitation laser modules (light output units) 21-1, 21-2, 21-3, and 21-4. Each of the optical couplers 23-1 and 23-2 includes four input ports and four output ports. The optical coupler 22 includes four input ports and four output ports. Two of the input ports of the optical coupler 23-1 are connected to two of the output ports of the optical coupler 22. Two of the input ports of the optical coupler 23-2 are connected to the other two of the output ports of the optical coupler 22.

According to the configuration of the light supply apparatus 20, the laser light output from the excitation laser modules 21-1, 21-2, 21-3, and 21-4 may be supplied to eight optical amplification media (optical fiber amplifiers) by using three couplers (optical couplers 22, 23-1, and 23-2). That is, the light supply apparatus 20 is able to achieve redundancy of the excitation laser module (light output unit) with a simpler configuration.

Third Example Embodiment

The third example embodiment relates to a variation of the configuration of the light supply apparatus.

Figure 4:
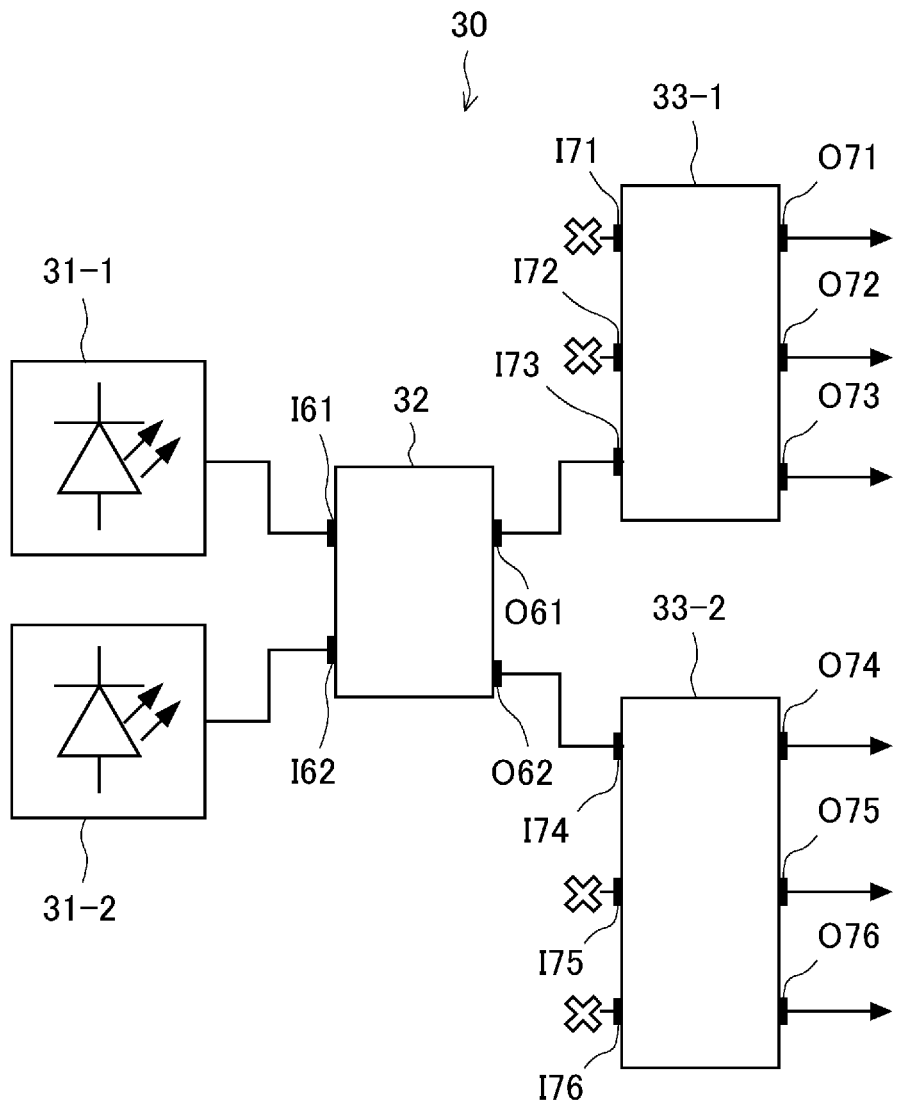
FIG. 4 is a block diagram illustrating one example of a light supply apparatus according to a third example embodiment.

FIG. 4 is a block diagram illustrating one example of a light supply apparatus according to the third example embodiment. In FIG. 4, a light supply apparatus 30 includes excitation laser modules (light output units) 31-1 and 31-2, an optical coupler (second optical coupler) 32, and optical couplers (first optical couplers) 33-1 and 33-2. Note that, in the following description, when the excitation laser modules (light output units) 31-1 and 31-2 are not distinguished from each other, such modules may be simply referred to as an excitation laser module (light output unit) 31, and when the optical couplers (first optical couplers) 33-1 and 33-2 are not distinguished from each other, such couplers may be simply referred to as an optical coupler (first optical coupler) 33.

The excitation laser module 31 is, for example, a laser diode. The excitation laser module 31 outputs laser light to the optical coupler 32. Specifically, the excitation laser module 31-1 is connected to an input port I61 of the optical coupler 32. The laser light output from the excitation laser module 31-1 is input to the input port I61 of the optical coupler 32. The laser light output from the excitation laser module 31-2 is input to an input port I62 of the optical coupler 32.

The optical coupler 32 includes the input ports I61 and I62 and output ports O61 and O62. That is, the optical coupler 32 is a 2×2 optical coupler. The optical coupler 32 divides combined light being acquired by combining (multiplexing) the laser light input from the input port I61 and the laser light input from the input port I62 into two beams of light, and outputs the two beams of light from the output ports O61 and O62, respectively. That is, the optical coupler 32 distributes the combined light of the laser light input from the input port I61 and the laser light input from the input port I62 to the output ports O61 and O62. Therefore, each beam of the light being output from the output port O61 and the light being output from the output port O62 includes both the laser light input from the input port I61 and the laser light input from the input port I62.

The output port O61 of the optical coupler 32 is connected to an input port I73 of the optical coupler 33-1, and the output port O62 is connected to an input port I74 of the optical coupler 33-2.

The optical coupler 33-1 includes input ports I71 to I73 and output ports O71 to O73. That is, the optical coupler 33-1 is a 3×3 optical coupler. As described above, the input port I73 is connected to the output port O61 of the optical coupler 32. Meanwhile, the input ports I71 and 172 are terminated by a non-reflective terminator (not illustrated). As a result, it is possible to prevent deterioration of light (excitation light) caused by interference or the like.

The optical coupler 33-1 divides the laser light input from the input port I73 into three beams of light, and outputs the three beams of light from the output ports O71 to O73, respectively. That is, the optical coupler 33-1 distributes the laser light input from the input port I73 to the output ports O71 to O73. Therefore, each beam of the light being output from the output ports O71 to O73 includes both of the laser light output from the excitation laser modules 31-1 and 31-2. Thus, even when one of the excitation laser modules 31 fails, the light being supplied to the optical fiber amplifier is not interrupted, and thereby the reliability of a repeater (not illustrated) may be improved.

Excitation light output from the output port O71 is supplied to a first optical amplification medium (optical fiber amplifier) provided in a first optical fiber via a first WDM coupler in an optical amplification apparatus of the repeater (not illustrated). Similarly, excitation light output from the output port O72 is supplied to a second optical amplification medium provided in a second optical fiber via a second WDM coupler in the optical amplification apparatus of the repeater (not illustrated). Excitation light output from the output port O73 is supplied to a third optical amplification medium provided in a third optical fiber via a third WDM coupler in the optical amplification apparatus of the repeater (not illustrated).

The optical coupler 33-2 includes input ports I74 to I76 and output ports O74 to O76. That is, the optical coupler 33-2 is a 3×3 optical coupler. As described above, the input port I74 is connected to the output port O62 of the optical coupler 32. Meanwhile, the input ports I75 and I76 are terminated by non-reflective terminators (not illustrated). As a result, it is possible to prevent deterioration of light (excitation light) caused by interference or the like.

The optical coupler 33-2 divides laser light input from the input port I74 into three beams of light, and outputs the three beams of light from the output ports O74 to O76, respectively. That is, the optical coupler 33-2 distributes the laser light input from the input port I74 to the output ports O74 to O76. Therefore, each beam of the light output from the output ports O74 to O76 includes both of the laser light output from the excitation laser modules 31-1 and 31-2.

Excitation light output from the output port O74 is supplied to a fourth optical amplification medium (optical fiber amplifier) provided in a fourth optical fiber via a fourth WDM coupler in the optical amplification apparatus of the repeater (not illustrated). Similarly, excitation light output from the output port O75 is supplied to a fifth optical amplification medium provided in a fifth optical fiber via a fifth WDM coupler in the optical amplification apparatus of the repeater (not illustrated). Excitation light output from the output port O76 is supplied to a sixth optical amplification medium provided in a sixth optical fiber via a sixth WDM coupler in the optical amplification apparatus of the repeater (not illustrated).

As described above, according to the third example embodiment, the light supply apparatus 30 includes the optical coupler 32, the optical couplers 33-1 and 33-2, and the excitation laser modules (light output units) 31-1 and 31-2. The optical couplers 33-1 and 33-2 each include three input ports and three output ports. The optical coupler 32 includes two input ports and two output ports. One of the input ports of the optical coupler 33-1 is connected to one of the output ports of the optical coupler 32. One of the input ports of the optical coupler 33-2 is connected to the other one of the output ports of the optical coupler 32.

With the configuration of the light supply apparatus 30, the laser light output from the excitation laser modules 31-1 and 31-2 may be supplied to six optical amplification media (optical fiber amplifiers) by using three couplers (optical couplers 32, 33-1, and 33-2). That is, the light supply apparatus 30 is able to achieve redundancy of the excitation laser module (light output unit) with a simpler configuration.

The first to third example embodiments can be combined as desirable by one of ordinary skill in the art.

An example advantage according to the above-described example embodiments is to provide a light supply apparatus capable of achieving redundancy of an excitation laser module (light output unit) with a simpler configuration.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

What is claimed is:

1. A light supply apparatus configured to output excitation light for exciting an amplification medium of an optical amplification apparatus, the light supply apparatus comprising:

two first optical couplers each configured to have M (M is an integer of 3 or more) input ports and M output ports;

a second optical coupler configured to have N (N is an even number of 2 or more and M or less) input ports and N output ports; and N light output units each configured to be connected to the N input ports, wherein N/2 input ports of each of the first optical couplers are connected to N/2 output ports of the second optical coupler, and N/2 output ports of the second optical coupler to which one of the two first optical couplers is being connected are different from N/2 output ports of the second optical coupler to which another of the two first optical couplers is being connected.

2. The light supply apparatus according to claim 1, wherein among the M input ports of the first optical coupler, an input port not being connected to the output port of the second optical coupler is terminated in a non-reflective manner.

3. The light supply apparatus according to claim 1, wherein the M is 4, and the N is 2.

4. The light supply apparatus according to claim 1, wherein the M is 4, and the N is 4.

5. The light supply apparatus according to claim 1, wherein the M is 3, and the N is 2.

6. The light supply apparatus according to claim 2, wherein the M is 4, and the N is 2.

7. The light supply apparatus according to claim 2, wherein the M is 4, and the N is 4.

8. The light supply apparatus according to claim 2, wherein the M is 3, and the N is 2.

* * * * *